(12) United States Patent
Schmidt

(10) Patent No.: US 8,180,568 B2
(45) Date of Patent: May 15, 2012

(54) METHOD FOR OPERATING A NAVIGATION SYSTEM

(75) Inventor: Thorsten W. Schmidt, Kitzingen (DE)

(73) Assignee: Garmin Würzburg GmbH (DE)

( * ) Notice: Subject to any disclaimer, the term of this patent is extended or adjusted under 35 U.S.C. 154(b) by 927 days.

(21) Appl. No.: 12/178,773

(22) Filed: Jul. 24, 2008

(65) Prior Publication Data
US 2009/0037094 A1 Feb. 5, 2009

(30) Foreign Application Priority Data
Aug. 2, 2007 (DE) .......................... 10 2007 036 627

(51) Int. Cl.
G01C 21/00 (2006.01)
(52) U.S. Cl. ........ 701/437; 701/400; 701/408; 701/409; 701/410; 701/411; 701/418; 701/420; 701/421
(58) Field of Classification Search ........... 701/200–226
See application file for complete search history.

(56) References Cited

U.S. PATENT DOCUMENTS

| | | | | |
|---|---|---|---|---|
| 5,629,854 A * | 5/1997 | Schulte | .......................... | 701/207 |
| 5,983,158 A * | 11/1999 | Suzuki et al. | .................. | 701/209 |
| 6,076,041 A * | 6/2000 | Watanabe | ...................... | 701/211 |
| 6,151,552 A * | 11/2000 | Koizumi et al. | ............... | 701/211 |
| 6,345,230 B1 * | 2/2002 | Hiyokawa et al. | ............. | 701/209 |
| 6,560,533 B2 | 5/2003 | Sugawara et al. | | |
| 6,581,001 B1 * | 6/2003 | Katsuka et al. | ............... | 701/209 |
| 6,611,753 B1 | 8/2003 | Millington | | |
| 2002/0188400 A1 * | 12/2002 | Sato et al. | ...................... | 701/212 |
| 2003/0109982 A1 * | 6/2003 | Burt et al. | ...................... | 701/200 |
| 2004/0243307 A1 * | 12/2004 | Geelen | .......................... | 701/213 |
| 2005/0102095 A1 | 5/2005 | Vanegas et al. | | |
| 2005/0216188 A1 | 9/2005 | Sumizawa et al. | | |
| 2006/0025923 A1 * | 2/2006 | Dotan et al. | ................... | 701/207 |

(Continued)

FOREIGN PATENT DOCUMENTS

| | | |
|---|---|---|
| DE | 101 22 455 A1 | 11/2001 |
| DE | 101 05 900 A1 | 8/2002 |
| DE | 10 2005 013 801 A1 | 11/2005 |

(Continued)

OTHER PUBLICATIONS

European Search Report, Application No. EP 08 01 1670, Mar. 8, 2011.

*Primary Examiner* — William Allen
(74) *Attorney, Agent, or Firm* — Samuel M. Korte

(57) ABSTRACT

A method for operating a navigation system includes the following steps:
a) computing a route from a starting point to a destination, wherein the route consists of a sequence of road segments and junctions between the road segments that is selected from a database, in which a geographic area is described in the form of road segments and junctions, with a route computation method,
b) computing at least one maneuvering instruction that contains instructions for the user in order to follow the route from the current position, and
c) computing and displaying a schematic maneuvering image on a display device, wherein the schematic maneuvering image graphically illustrates the maneuvering instructions in schematic form, wherein adjacent junctions that do not lie along the route and/or adjacent road segments that do not lie along the route and do not converge with a junction along the route are also analyzed during the computation of the schematic maneuvering image, wherein at least part of the adjacent road segments and/or adjacent junctions is illustrated in the schematic maneuvering image in addition to the maneuvering instruction that represents the route.

6 Claims, 13 Drawing Sheets

U.S. PATENT DOCUMENTS

| | | | |
|---|---|---|---|
| 2006/0217882 A1 | 9/2006 | Takashima et al. | |
| 2006/0287815 A1* | 12/2006 | Gluck | 701/208 |
| 2007/0027628 A1* | 2/2007 | Geelen | 701/213 |
| 2007/0055444 A1 | 3/2007 | Mikame | |
| 2007/0192020 A1* | 8/2007 | Brulle-Drews et al. | 701/200 |
| 2007/0260392 A1* | 11/2007 | Paolini et al. | 701/117 |
| 2007/0276596 A1* | 11/2007 | Solomon et al. | 701/211 |
| 2009/0210151 A1* | 8/2009 | Toyoda | 701/208 |

FOREIGN PATENT DOCUMENTS

| | | |
|---|---|---|
| DE | 10 2006 013 242 A1 | 9/2006 |
| DE | 10 2006 041 433 A1 | 3/2007 |
| EP | 0 534 533 A1 | 3/1993 |
| EP | 1 347 269 A1 | 9/2003 |
| EP | 1748281 A2 | 1/2007 |
| GB | 2 260 210 A | 4/1993 |

\* cited by examiner

METHOD FOR OPERATING A NAVIGATION SYSTEM

CROSS-REFERENCE TO RELATED APPLICATION

This application claims the priority benefit of German Patent Application No. 10 2007 036 627.4 filed on Aug. 2, 2007, the contents of which are hereby incorporated by reference as if fully set forth herein in their entirety.

STATEMENT CONCERNING FEDERALLY SPONSORED RESEARCH OR DEVELOPMENT

Not applicable.

FIELD OF THE INVENTION

The invention pertains to a method for operating a navigation system, and in particular, a method of operating a navigation system that displays at least a portion of a route.

BACKGROUND OF THE INVENTION

Navigation systems of the generic type are used, for example, as mobile navigation devices in order to guide the driver of a motor vehicle from a starting point to a destination. In this case, the navigation device scans the data of a database, in which a geographic area is described in the form of road segments and junctions. Consequently, the database contains a network of road segments and intermediate junctions that describe the road system, particularly the road network, in a certain form and therefore allow the processing in a data processing system by means of corresponding computing algorithms. A route in the form of a sequence of road segments and junctions that guides the user from the starting point to the destination is selected from the data of the database by means of a suitable routing computation method.

However, known navigation systems not only compute the route from the starting point to the destination. These navigation systems also compute maneuvering information that contains instructions for the user in order to carry out maneuvers that follow the route from the current position along the route. For example, if the user reaches a road intersection, maneuvering instructions are computed that inform the user of the direction, in which he needs to turn at the road intersection.

The output of the maneuvering instructions for the user can be realized in different ways. The maneuvering instructions are usually output acoustically in the form of a voice announcement. During a turning maneuver at an intersection, for example, the following announcement may be output: "Please turn left at the next intersection". However, maneuvering instructions that are output acoustically have the disadvantage of no longer being continuously available to the user after the announcement. If the user did not understand the acoustic maneuvering instructions, it is either necessary to repeat the maneuvering instructions or the user needs to continue maneuvering without corresponding instructions. In order to solve this problem, known navigation systems also feature so-called schematic maneuvering images. In the schematic maneuvering image, at least the next maneuver to be executed and/or the maneuver to be executed after the next maneuver is graphically illustrated in schematic form and this graphic illustration is continuously displayed on a display device until the corresponding maneuver is executed. For example, if the user reaches an intersection between two roads, the schematic maneuvering image may consist of a schematic road intersection in the form of an orthogonal cross and the turning direction required in accordance with the maneuvering instructions is displayed in the form of a motion arrow.

The computation and display of the schematic maneuvering image represents an additional computation process during the operation of a navigation system that is particularly time-critical in the real-time mode of mobile navigation devices. During the computation of the schematic maneuvering image that is known from the state of the art, one therefore only resorts to data that is already known from the route computation. In other words, this means that the known methods for computing and displaying a schematic maneuvering image only take into account junctions and road segments that lie along the route itself. In addition, road segments that intersect or converge with the computed route, i.e., road segments that share at least one junction with the route, may also be incorporated into the schematic maneuvering image. This method of computing the schematic maneuvering image is based on the notion that it suffices to display the roads and junctions along the route to the user in the schematic maneuvering image in order to enable the user to execute the maneuver.

In practical applications, however, this notion has proved to be incorrect in certain instances. Particularly at confusing road configurations, for example, at intersections with a number of intersecting roads, it does not suffice for the optimal orientation of the user to merely display the roads and junctions that lie along the route to the user in the schematic maneuvering image. On the contrary, such a schematic maneuvering image that only illustrates part of the actual road situation can contribute to the confusion of the user, for example, because it is not possible to recognize on which of the different roads the user should turn at a confusing intersection. Consequently, maneuvering instructions that are output acoustically or optically have the disadvantage of frequently being ambiguous.

SUMMARY OF THE INVENTION

Based on this state of the art, the present invention aims to propose a new method for operating a navigation system that simplifies the orientation of the user by computing and displaying an improved schematic maneuvering image. The new method is based on the essential notion that certain road situations make it necessary to completely display the road situation in the adjacent surroundings up to the next maneuver in order to ensure the unambiguous orientation of the user. For example, if six roads intersect with a square, it does not suffice for the orientation of the user based on the schematic maneuvering image if only the square and the two roads, along which the square is crossed in accordance with the pre-computed route, are shown in the schematic maneuvering image. A correct orientation is only possible if the entire square with all entering and exiting roads is shown, wherein the entering or exiting road to be chosen in accordance with the route needs to be suitably identified, for example, with a corresponding coloration.

This is achieved in the preferred embodiment by expanding the analysis of the surrounding road situation in the inventive computation of the schematic maneuvering image. Junctions that are situated adjacent to the current position and do not lie along the route and/or road segments situated adjacent to the current position that do not lie along the route and do not converge with a junction along the route are also incorporated into the analysis. The decision criteria, in dependence on which junctions and road segments are classified as "adjacent" relative to the current position or relative to the next maneuver to be executed, are essentially arbitrary. For example, an analysis area of predefined size could be configured around each maneuver, wherein the road situation in this predefined analysis area is then completely analyzed and displayed in the schematic maneuvering image.

The method described herein is suitable, in principle, for providing the user with an unambiguous orientation in the form of the schematic maneuvering image in confusing road situations. This improved approach for the orientation of the user is of particular importance during maneuvers in a traffic circle. Conventional traffic circles feature a circularly configured road. If the route computed by the navigation system extends along a road segment that is identified as being part of a traffic circle, for example, due to the storage with a corresponding traffic circle attribute, a circular symbol is shown in the schematic maneuvering image of known systems. In this case, the illustration of this circular symbol in the schematic maneuvering image is based solely on the determination that at least one road segment of the computed route forms part of a traffic circle. The illustration of the circular symbol in the schematic maneuvering image frequently does not reflect the actual local circumstances such that it is difficult for the driver to orient himself based on the illustration of the schematic maneuvering image while driving along a traffic circle.

According to one preferred embodiment of the invention, it is therefore proposed to also incorporate junctions and road segments of the traffic circle that do not lie along the route into the analysis for computing the schematic maneuvering image during the computation of the schematic maneuvering image for graphically illustrating a maneuver in a traffic circle. This makes it possible, in particular, to also analyze the geometric configuration of the traffic circle with respect to parts not to be driven along the route and to correspondingly illustrate this configuration in the schematic maneuvering image. Additionally or alternatively to the analysis of junctions and road segments of the traffic circle that do not lie along the route, road segments that do not form part of the traffic circle, but converge with at least one junction of the traffic circle can also be incorporated into the preparatory analyses for the computation of the schematic maneuvering image. This makes it possible, in particular, to incorporate entering and exiting roads of the traffic circle, i.e., road sections that end in the traffic circle, into the analysis such that they can be subsequently displayed in the schematic maneuvering image. Consequently, this approach makes it possible to illustrate the actual geometric configuration of the traffic circle in the schematic maneuvering image such that it can be intuitively recognized.

The schematic maneuvering images with the best quality are obtained if all road segments and all junctions that form part of the traffic circle and/or all road segments that converge with a junction of the traffic circle are incorporated into the analysis for computing the schematic maneuvering image. In order to illustrate traffic circles in the schematic maneuvering image in such a way that they can be adequately recognized intuitively and conform very well to the actual road situation, the relative arrangement of the center of the traffic circle is of the utmost importance. However, the actual center of the traffic circle is usually not taken into account in known systems. It is rather frequently assumed that the center of the traffic circle lies at the intersecting point of the roads that enter the traffic circle. This assumption leads to satisfactory results in traffic circles, in which the exiting roads extend from the traffic circle in a radiating fashion. However, in traffic circles that deviate from this ideal conception, for example, because the entering roads intersect the traffic circle at an obtuse or acute angle, this approach results in misinterpretations that lead to a mistakable illustration of the traffic circle in the maneuvering image. In order to avoid these errors, it is therefore proposed that the data of the road segments and/or the junctions that form part of the traffic circle are evaluated in such a way that the position of the center of the traffic circle can be derived from this data, namely regardless of whether these road segments and junctions also form part of the route. The relative position of the center of the traffic circle can then be taken into account, in particular, in the computation and display of the schematic maneuvering image.

If the road segments and junctions are coded in the form of their X-coordinates and Y-coordinates in the database, the computation of the center of the traffic circle can be realized in a very simple fashion. In a first step of the computation, all X-coordinates of the junctions and/or the road segments are added and the sum is subsequently divided by the number of junctions and/or road segments. The result of the division then yields the X-coordinate of the center of the traffic circle. The same computation can be repeated for the Y-coordinate in a second step in order to thusly determine the Y-coordinate of the center of the traffic circle. Once the X-coordinate and the Y-coordinate of the center of the traffic circle are known, these coordinates that describe the position of the center of the traffic circle relative to all other road segments or junctions stored in the database can be used in all further analyses for computing the schematic maneuvering image.

In known navigation systems, a traffic circle symbol that usually consists of a circular ring is always shown in the schematic maneuvering image if the road to be traveled contains at least one road segment that is identified as being part of a traffic circle. The corresponding road segment may be stored in the database, for example, with a traffic circle attribute. In addition to the traffic circle symbol, the schematic maneuvering image also shows the road of the route, via which the user enters the traffic circle, and the road of the route, via which the user exits the traffic circle again. Entering and exiting roads of a traffic circle should generally be referred to as intersecting roads.

In improved navigation systems, it is also known to not only show the intersecting roads that lie along the route in the schematic maneuvering image, but also to symbolically display the intersecting roads of the traffic circle that converge with the traffic circle at a junction also lying along the route. The display of the intersecting roads in accordance with the prior art consequently is entirely route-based such that only intersecting roads of the traffic circle that lie along the route or converge with a junction that also lies along the route are displayed in the schematic maneuvering image. However, intersecting roads of the traffic circle that do not lie along the route and also do not converge with a junction that lies along the route are not displayed in the schematic maneuvering image of known navigation systems. This is very disadvantageous. One reason for this can be seen in that all intersecting roads are normally illustrated on road signs indicating the drivable intersecting roads of a traffic circle. This discrepancy between the illustrations of the traffic circle with its intersecting roads in the schematic maneuvering image and on the road signs can easily confuse the user.

In addition, the only partial illustration of the intersecting roads of the traffic circle in the schematic maneuvering image can lead to significant problems in driving situations that are specific for traffic circles. For example, if the driver did not turn at the intended exiting road that corresponds to the desired route, but rather drove past the predefined exit in the traffic circle, the driver is unable to sufficiently orient himself based on known schematic maneuvering images. In conventional schematic maneuvering images, the intersecting roads of the traffic circle that are interesting for the orientation after driving past the actually intended exit are not displayed because they do not lie on or along the originally planned route. The re-computation and correspondingly revised display of the schematic maneuvering image is usually not possible in this driving situation because the driving times in traffic circles are extremely short. Consequently, if the driver deviates from the planned route in the traffic circle, conventional schematic maneuvering images no longer provide sufficient orientation, but rather lead to confusion.

In order to avoid these two problems and to enable the user to recognize the traffic circle to be currently driven in a largely intuitive fashion in the schematic maneuvering image, one special variation of the method proposes to analyze all entering and exiting intersecting roads of the traffic circle for the computation of the schematic maneuvering image and to display all these intersecting roads in the schematic maneuvering image. This type of analysis can be realized, for example, in such a way that, based on the road sections of the route that are identified as being part of a traffic circle, a search is carried out for all junctions and road segments that lie adjacent to the respectively next road segment and are also stored in the database with the traffic circle attribute. Consequently, all road segments and junctions that describe the traffic circle in the database are known. Subsequently, all junctions that form part of a traffic circle can be checked as to whether these junctions are connected to road segments that do not carry the traffic circle attribute. These road segments can then be identified as being part of intersecting roads and can subsequently be displayed in the schematic maneuvering image. The proposed variation of the method ensures that the number of intersecting roads indicated in the schematic maneuvering image corresponds to the actual number of intersecting roads along the traffic circle such that the driver is able, in particular, to orient himself by counting the intersecting roads in the traffic circle.

With respect to the ability to intuitively recognize the schematic maneuvering image, the manner in which the intersecting roads are illustrated is also very important. The position of the display elements symbolizing the intersecting roads relative to the circular line symbolizing the traffic circle is of particular importance. In order to illustrate the actual position of the intersecting roads around the traffic circle, particularly the intersecting angle, at which the entering and exiting intersecting roads extend relative to the traffic circle, in a geometrically corrected fashion, it would be necessary to carry out complex geometric analyses of the local data describing the intersecting roads and the traffic circle. Such analyses require much computing time and therefore can usually not be carried out sensibly. In addition, user studies have shown that the users do not require illustrations that are completely correct with respect to geometric considerations in order to intuitively recognize the configuration of the traffic circle.

It is therefore proposed to respectively indicate the intersecting roads in the form of radiating sections regardless of the actual geometric position of the intersecting roads. These radiating sections that symbolize the intersecting roads respectively end on the circular line or segmental line that symbolizes the traffic circle, wherein an imaginary extension of the radiating sections extends through the center of the circular line in a radiating fashion. Consequently, this type of illustration is simplified in that the intersecting angle is respectively illustrated as being 90° regardless of the actual intersecting angle of the intersecting road with the traffic circle. This simplified illustration of the intersecting angle is also particularly useful because the illustration of traffic circles and their intersecting roads on traffic signs is usually also simplified in this fashion. In this respect, the user is able to easily harmonize the illustration on the traffic signs of a traffic circle with the illustration of the traffic circle in the schematic maneuvering image.

Another desirable aspect for intuitively recognizing the configuration of the traffic circle with its intersecting roads in the schematic maneuvering image is that the relative position between the different intersecting roads essentially corresponds to the actual circumstances. The user should be able, in particular, to easily recognize in the schematic maneuvering image how far he needs to drive in the traffic circle in order to travel from one intersecting road to another intersecting road. In other words, this means that the schematic maneuvering image should make it possible for the user in accordance with the actual circumstances to easily recognize whether he only needs to drive along the traffic circle for a very short distance in order to turn at the correct exit or he needs to continue to drive along the traffic circle. In this respect, it should be easily possible, in particular, to recognize if one quarter, two quarters or three quarters of the traffic circle need to be traveled between two intersecting roads. Naturally, it would be desirable if the recognizability of the relative position of the individual intersecting roads along the traffic circle could be realized in even smaller increments. In order to realize the correct illustration of the relative position of the intersecting roads along the traffic circle, it would naturally be possible to once again carry out complex geometric analyses of the geometric data of the traffic circle. However, the computing time required for these analyses usually is also not available during the computation of the schematic maneuvering image.

Consequently, the invention proposes a method for illustrating the relative position of the individual intersecting roads which can be carried out in a simplified fashion. This variation of the method is based on the basic premise that the individual intersecting roads are illustrated in the form of radiating sections, the extensions of which extend through the center of the circular line symbolizing the traffic circle. With consideration of this premise, the illustration of the individual intersecting roads only has one degree of freedom, namely the intermediate angles between the individual radiating sections, at which these radiating sections are indicated relative to one another in the schematic maneuvering image. These intermediate angles in the illustration of the intersecting roads in the schematic maneuvering image should largely correspond to the intuitive perception of the user while looking at a road map. In order to realize this, it is proposed that the immediate angle between the radiating sections that symbolize the intersecting roads in the schematic maneuvering image is chosen in such a way that the position of the intersecting roads relative to the actual center of the traffic circle is taken into account. This is realized by initially defining an interpolation point on each of the intersecting roads to be illustrated in the schematic maneuvering image. The only initial criterion for this selection is that the interpolation point needs to lie on the intersecting road.

In order to determine the intermediate angle between two radiating sections that should represent two intersecting roads in the schematic maneuvering image, it is necessary to determine the angle included by the two straight lines that respectively extend through the interpolation point of both intersecting roads to be illustrated and the center of the traffic circle. The intermediate angle between the two radiating sections that represent two intersecting roads in the schematic maneuvering image then results from this simple geometric observation. The resulting illustration corresponds very well to the user's intuitive perception of an actual traffic circle with its intersecting roads.

In practical applications, this method may be realized, for example, as described below. In order to illustrate a maneuver, during which the driver needs to travel along a traffic circle that is entered via a first intersecting road and exited again via a second intersecting road, the traffic circle is conventionally illustrated in the form of a closed circular line. The intersecting road used for entering the traffic circle is conventionally indicated the form of a radiating section that points vertically downward on the display device. The intersecting road used for exiting the traffic circle is also illustrated in the form of a radiating section, the extension of which extends through the center of the circular line. The intermediate angle between these two radiating sections is obtained by means of a simple geometric analysis of the center of the traffic circle that is derived from the geometric data of the traffic circle and of the two interpolation points defined on the intersecting roads.

Due to the constructional circumstances at the entrance or exit of most intersecting roads, these roads frequently have a significant curvature in the region directly before the traffic circle in order to thusly simplify the entrance and exit of the motor vehicles. The immediate intersecting region of the intersecting roads therefore is not significant for the intuitive observation and perception of the traffic circle geometry. This is the reason why the interpolation point used for computing the intermediate angle should not lie on the traffic circle or in the immediate vicinity of the intersecting point with the traffic circle. A much better and intuitively simpler recognizability is attained if the interpolation point on the intersecting road that serves for computing the intermediate angle and the junction, at which this intersecting road converges with the traffic circle, are spaced apart by a sufficient distance. The amount of this distance can be predefined, for example, by indicating a certain distance in meters between the intersecting point and the interpolation point. This distance between the junction that forms the intersecting point of the intersecting road and the interpolation point for computing the intermediate angle ensures that significant curvature radii of the intersecting road in the immediate vicinity of the intersecting point are filtered out. However, the distance between the intersecting point and the interpolation point also should not be excessively large in order to still significantly reflect the geometric position of the intersecting road on the traffic circle.

Another problem in the graphic illustration of traffic circle maneuvers in the schematic maneuvering image can be seen in that different types of entering and exiting roads intersect with the traffic circle. In case of a conventional two-way road with an entrance and an exit into/from the traffic circle, the traffic situation is easily recognized based on the schematic image. However, if the road consists of a one-way road, on which vehicles can only drive in one direction, this can easily contribute to the confusion of the driver because the lack of a suitable identification in the illustration of such a one-way road in the schematic maneuvering image leads the driver to the assumption that he could enter as well as exit the traffic circle at this location. This applies, in particular, to one-way roads that are formed by dividing a continuous roadway into two one-way roads that lie directly adjacent to one another with suitable measures, for example, a partition wall or partition marking.

This type of one-way road is usually identified with the attribute "multidigitized" in the databases of cartographers that make available digital map material. In order to configure a schematic maneuvering image of the traffic circle that largely can be adequately recognized intuitively, the intersecting roads should be analyzed as to whether they respectively consist of a two-way road with an entrance and an exit or of a one-way road with an entrance or an exit only. If the intersecting road consists of a one-way road, it should also be determined if this road consists of a multidigitized one-way road. The illustration of the individual types of intersecting roads can be chosen differently in dependence on the result of the analysis of the intersecting roads.

With respect to the illustration of two-way roads, it is proposed to utilize the conventional illustration, in which the two-way roads are respectively indicated in the form of a single radiating section in the schematic maneuvering image, wherein the radiating section ends on the circular line that symbolizes the traffic circle.

With respect to the illustration of one-way roads, it is also sensible to graphically symbolize these roads in the form of radiating sections in the schematic maneuvering image. However, in order to distinguish one-way roads from two-way roads, the permitted driving direction of the one-way road should also be indicated. If it is determined during the analysis of the intersecting roads that several one-way roads, particularly multidigitized roads, are positioned along the traffic circle, it needs to be examined if these roads actually form a common road. Consequently, suitable geometric analyses are initially carried out in order to determine if two one-way roads extend closely adjacent to one another. In addition, it can also be checked if the two one-way roads extend in opposite directions. If this is the case, it is sensible to indicate these two one-way roads as one common radiating section in the schematic maneuvering image analogous to a two-way road because the user typically perceives such pairs of one-way roads that extend in opposite directions as one common road.

The analysis with respect to the direction, in which the two one-way roads identified as multidigitized extend, can be carried out in a particularly simple fashion by observing the intermediate angle used for illustrating the different intersecting roads. One-way roads that extend closely adjacent to one another have a small intermediate angle while one-way roads that are spaced apart by a large distance result in a large intermediate angle. Consequently, it is possible to predefine a limiting angle and to compare the intermediate angle between two one-way roads with this limiting angle. If the limiting angle is suitably chosen, this comparison shows that both one-way roads extend closely adjacent to one another and therefore should be illustrated together if the limiting angle is not reached, wherein the one-way roads actually extend separately and therefore need to be respectively illustrated in the form of separate one-way roads in the schematic maneuvering image if the limiting angle is exceeded.

If two one-way roads are identified as extending closely adjacent to one another by means of the proposed analysis and therefore are illustrated together in the form of one radiating section in the schematic maneuvering image analogous to a two-way road, there still remains the question of the relative arrangement of this radiating section, namely because two one-way roads are actually symbolized. The proposed geometric observations that utilize the center of the traffic circle and the interpolation points on the two one-way roads result in respectively separate intermediate angles for the two one-way roads. In order to illustrate both one-way roads in a suitable and intuitively well recognizable fashion in the schematic maneuvering image, it is therefore sensible to indicate the radiating section used in the schematic maneuvering image with an intermediate angle that corresponds to the average value resulting from the intermediate angles for the two separate one-way roads.

Various aspects and embodiments of the invention are schematically illustrated in the figures and are described in an exemplary fashion below.

DETAILED DESCRIPTION OF THE EXAMPLE EMBODIMENTS

Figure 1:
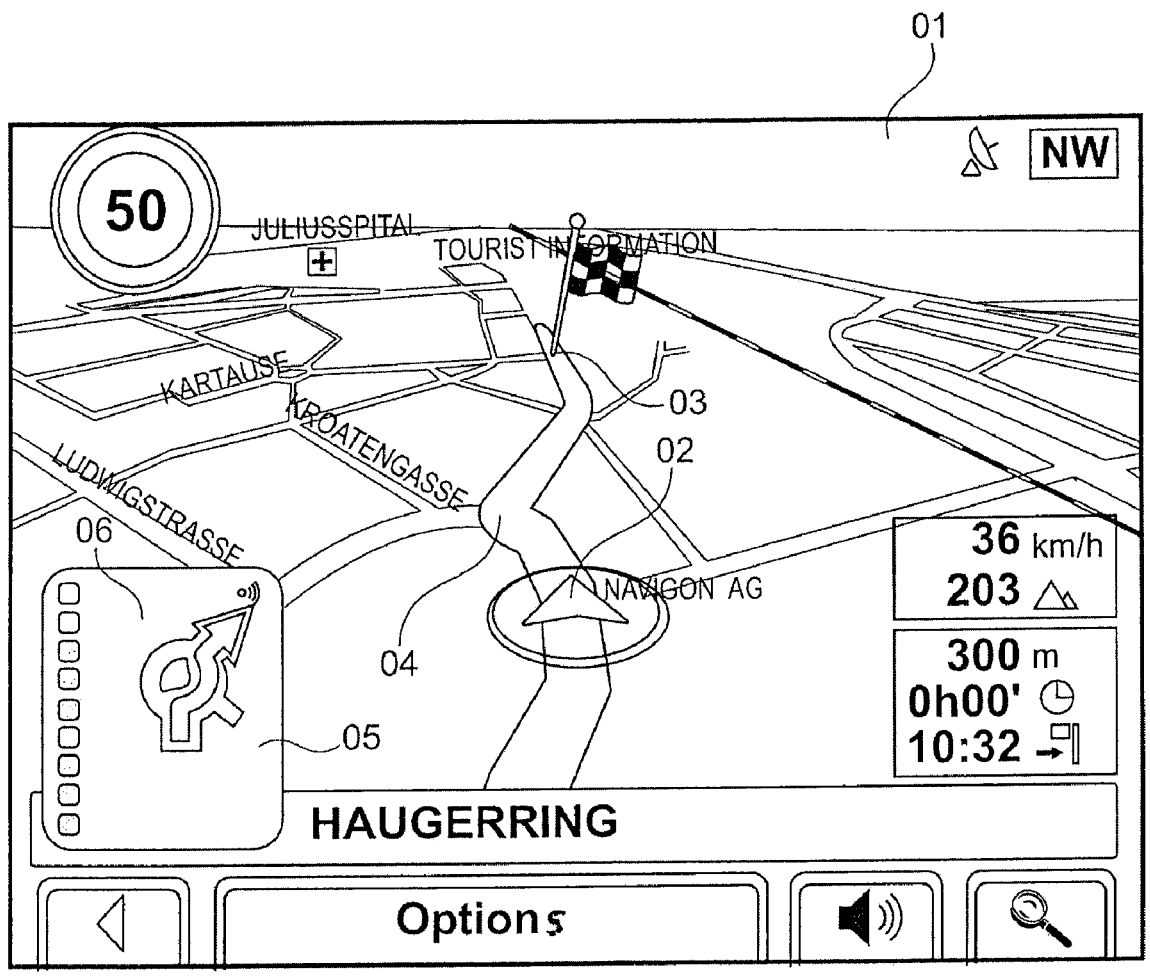
FIG. 1 is a representation of a display unit of a mobile navigation device that shows a schematic maneuvering image.

FIG. 1 shows the image content of a display device 01 as it is illustrated, for example, on the monitor of a mobile navigation device. The road situation relative to the current position that is indicated in the form of an arrow symbol 02 and the route 04 leading to the destination 03 are illustrated in the form of a perspective representation. In addition, a schematic maneuvering image 05 is shown in the lower left corner of the display device 01 and graphically illustrates the next maneuver to be carried out by the driver in order to follow the planned route in schematic form. The next maneuver along the route 04 requires driving through a traffic circle that is not illustrated in greater detail in FIG. 1 and is schematically indicated in the form of a circle symbol 06 in the schematic maneuvering image 05.

Figure 2:
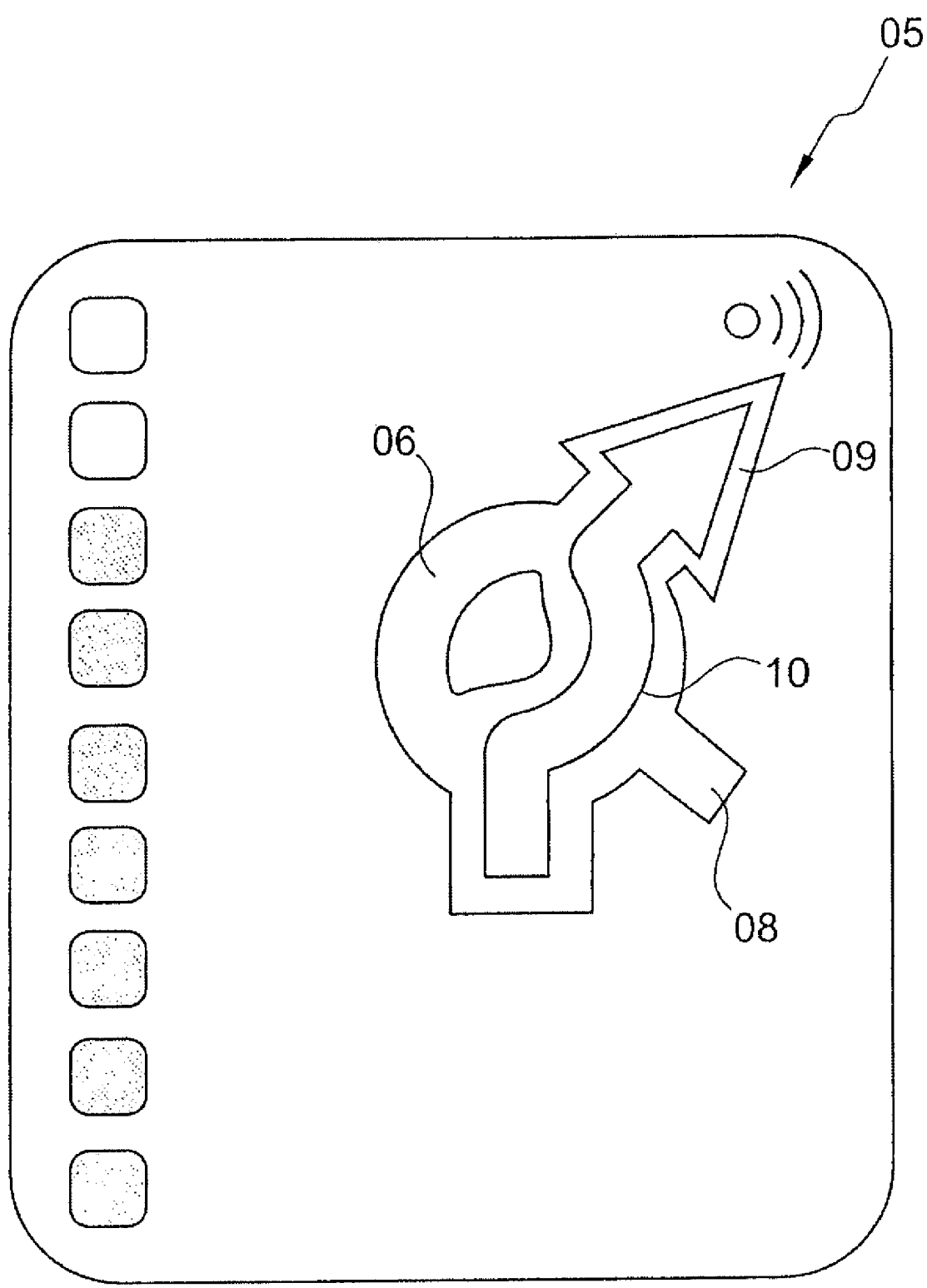
FIG. 2 is an enlarged representation of the schematic maneuvering image according to FIG. 1.

FIG. 2 shows an enlarged representation of the schematic maneuvering image 05. The traffic circle to be traveled along the route 04 has three intersecting roads that are graphically symbolized by three radiating sections 07, 08 and 09 in the schematic maneuvering image 05. The route 04 is graphically symbolized by a motion arrow symbol 10 in the schematic maneuvering image 05. The driver recognizes that he needs to enter the traffic circle via the intersecting road symbolized by the radiating section 07 and exit the traffic circle via the intersecting road symbolized by the radiating section 09.

In this case, the illustration of the schematic maneuvering image 05 corresponds to the prior art because all symbols illustrated in order to symbolize the maneuver to be carried out are directly related to the route 04 computed by the routing algorithm. The circle symbol 06 is shown because the route comprises a section of a traffic circle. The radiating sections 07 and 09 are shown because these road sections form part of the route and the radiating section 08 is shown because the corresponding intersecting road converges with the traffic circle in a region that forms part of the route. However, it is impossible to evaluate if the traffic circle illustrated in the schematic maneuvering image 05 also features other components, particularly other intersecting roads, based on the schematic maneuvering image 05 because a corresponding analysis is not carried out independently of the route 04.

Figure 3:
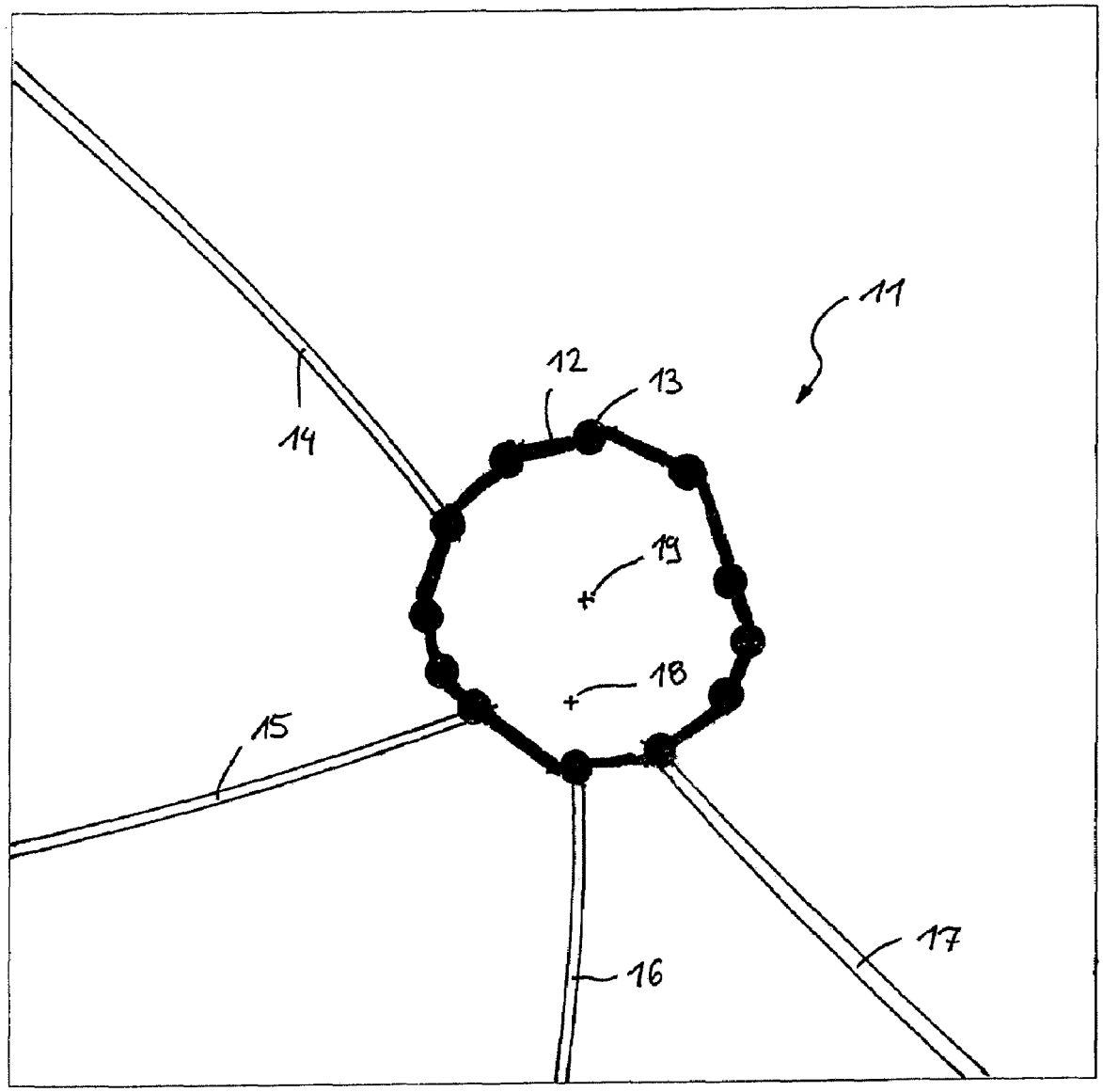
FIG. 3 is a section of a digital map that describes a geographic area with a traffic circle.

FIG. 3 shows a schematically simplified illustration of a digitally stored traffic circle 11 that is stored in a digital database in the form of the X-coordinates and the Y-coordinates of its road segments 12 and its junctions 13. In order to describe the geometry of the traffic circle 11 even more accurately, other interpolation points may also be placed along the road segments 12 and may be stored in the database.

In the embodiment shown, four intersecting roads 14, 15, 16 and 17 converge with the traffic circle 11. In order to store the intersecting roads 14 to 17, these intersecting roads are also separated into road segments and junctions, wherein these road segments and junctions are not illustrated in a distinguished fashion in the illustration according to FIG. 3 and also in the subsequent figures for the sake of better recognizability.

Figure 4:
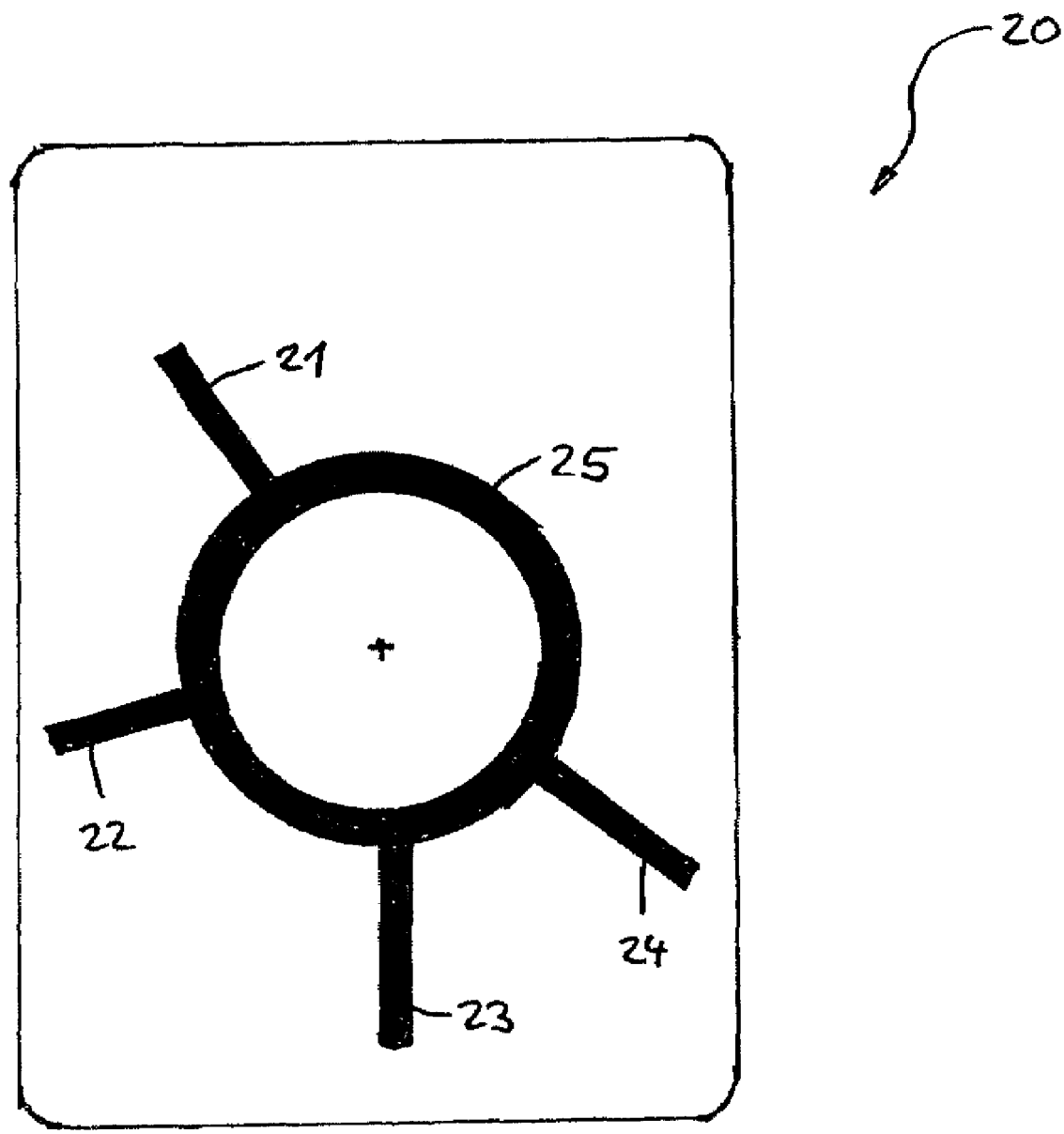
FIG. 4 is an incorrect schematic maneuvering image of the traffic circle according to FIG. 3.
Figure 5:
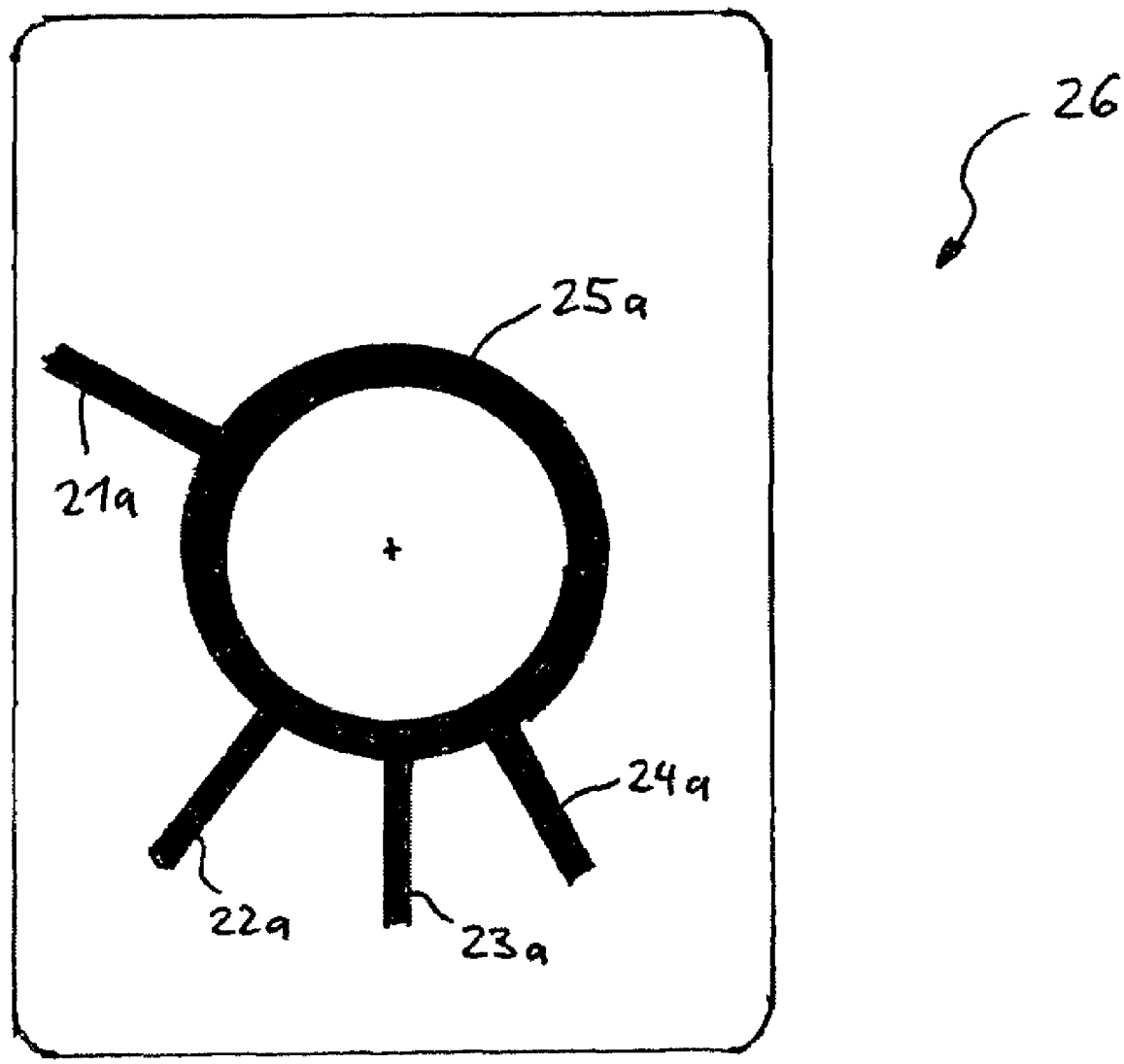
FIG. 5 is an inventive illustration of the schematic maneuvering image of the traffic circle according to FIG. 3.

The example of a digital map shown in FIG. 3 and the corresponding schematic maneuvering images shown in FIG. 4 and FIG. 5 are used for explaining how the method proposed in accordance with the invention differs with respect to the determination of the center of the traffic circle. According to the known prior art, the center of a traffic circle is interpolated from the intersecting point of the extensions of the intersecting roads. In the example illustrated in FIG. 3, this results in a center 18. One can immediately ascertain that the center 18 does not correspond to the actual center 19 of the traffic circle 11.

FIG. 4 shows a schematic maneuvering image 20, in which the traffic circle 11 and the intersecting roads 14 to 17 are illustrated, wherein the center 18 serves as a relative reference point in order to symbolize the radiating sections 21 to 24 that serve for symbolizing the intersecting roads 14 to 17. The traffic circle 11 is symbolized by the circle symbol 25. Due to the incorrect placement of the center 18, the road sections 21 to 24 are illustrated in the schematic maneuvering image 20 in a relative arrangement that does not reflect the actual arrangement. The shifted center 18, in particular, results in an excessively large distance between the radiating sections 21 to 24 that symbolize the intersecting roads 14 to 17, wherein this creates the impression that one-eighth of the traffic circle 11 needs to be traveled between the intersecting road 16 and the intersecting road 17.

According to the inventive method, the actual center 19 is initially computed from all junctions 13 or from all road segments 12 of the traffic circle in order to illustrate the traffic circle 11 and the intersecting roads 14 to 17 in a schematic maneuvering image of the type illustrated in FIG. 5. In the inventive computation of the schematic maneuvering image 26 (see FIG. 5), the relative position of the road sections 21a to 24a that symbolize the intersecting roads 14 to 17 is derived with consideration of the coordinates of the actual center 19 of the traffic circle 11. One can ascertain, in particular, that the distances between the intersections of the radiating sections 21a to 24a with the circle symbol 25a reflect the actual circumstances of the intersecting points between the intersecting roads 14 to 17 and the traffic circle 11.

Figure 6:
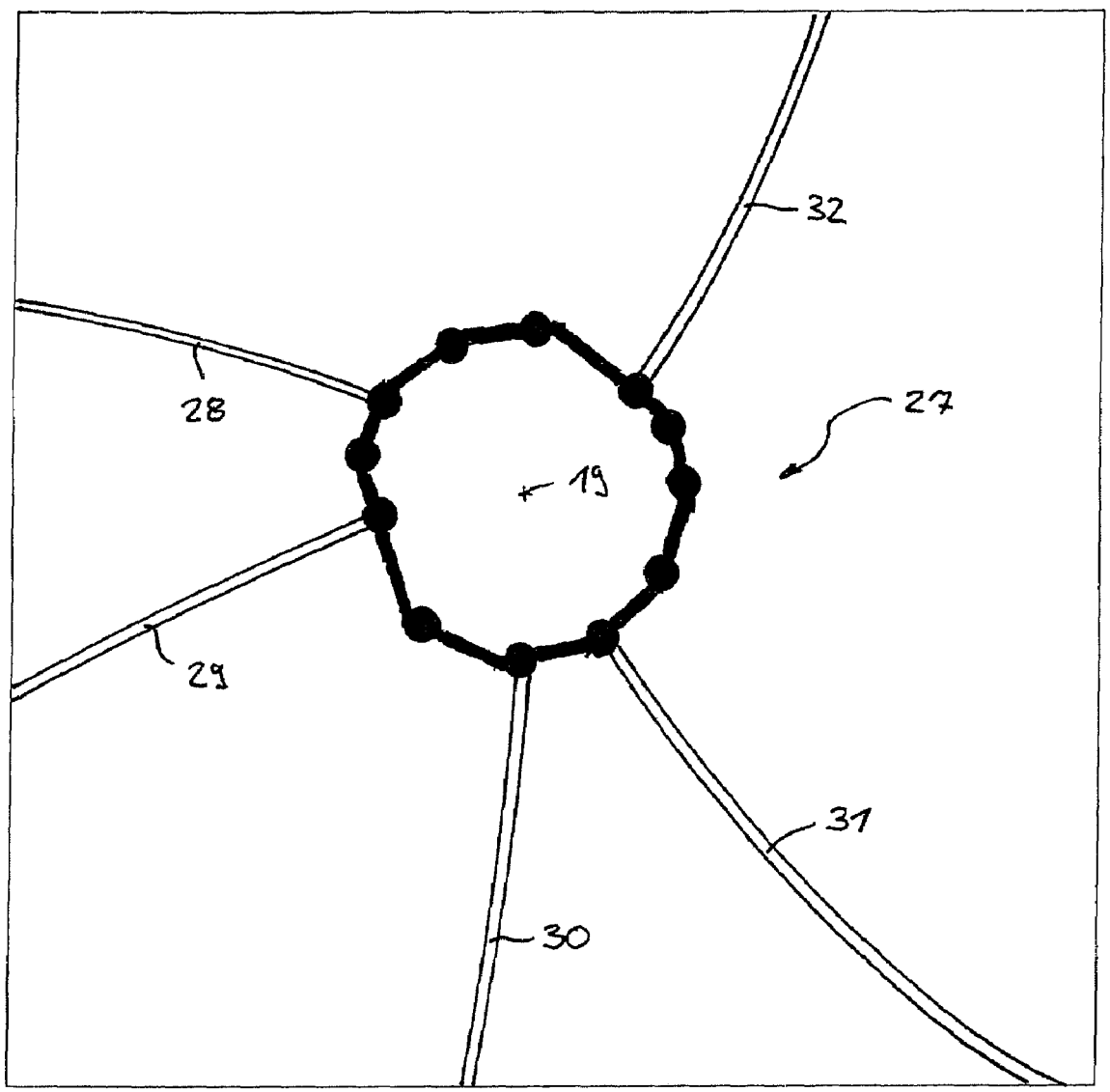
FIG. 6 is a section of a geographic area with a second embodiment of a traffic circle.

FIG. 6 shows another example of a traffic circle 27, the geometric configuration of which corresponds to that of the traffic circle 11. This traffic circle 27 has five intersecting roads 28 to 32.

Figure 7:
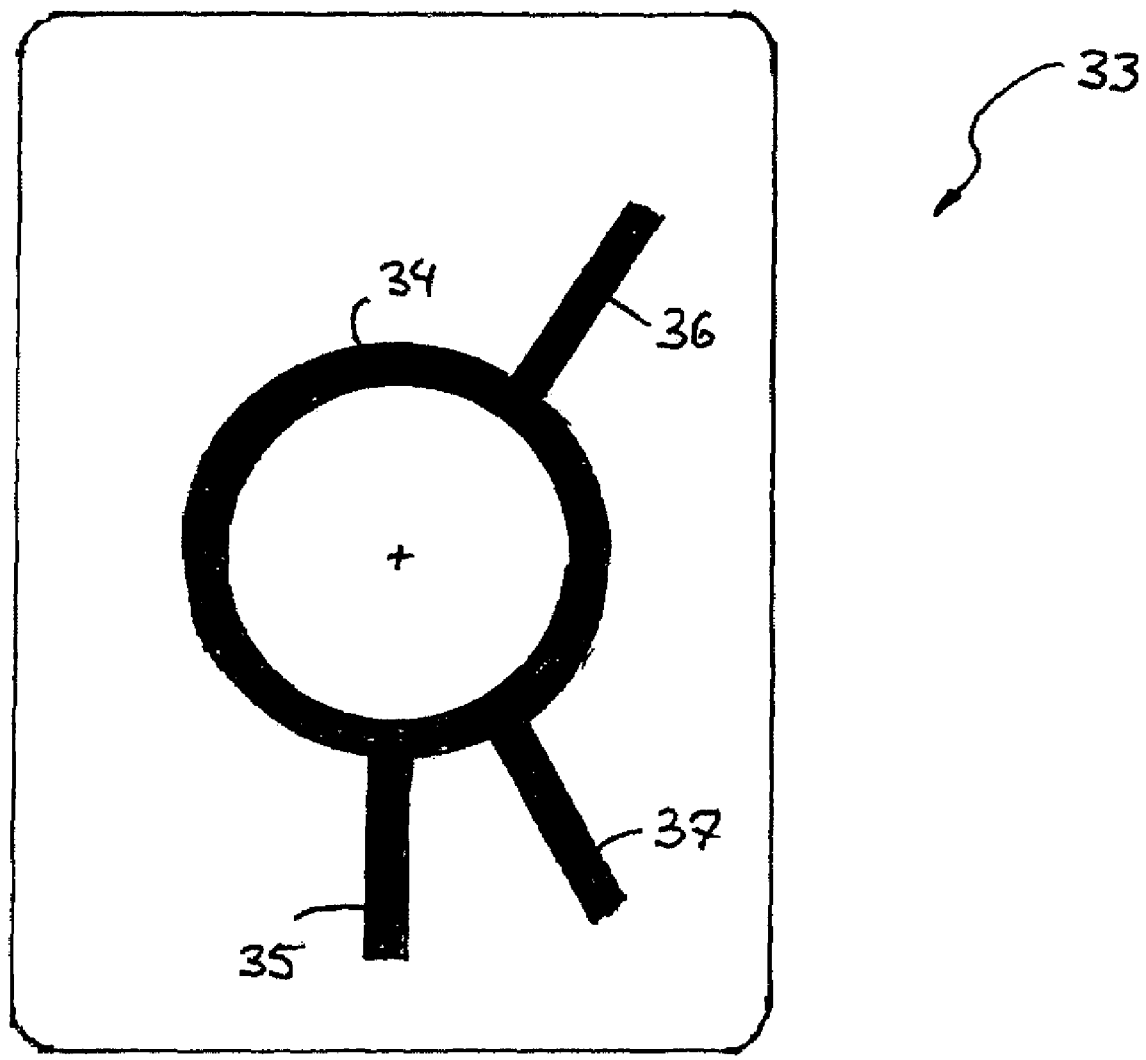
FIG. 7 is an incorrect illustration of the traffic circle according to FIG. 6 in a schematic maneuvering image.

FIG. 7 shows a schematic maneuvering image 33 that corresponds to the known prior art if the pre-computed route along the traffic circle 27 extends from the intersecting road 30 to the intersecting road 32. In other words, the schematic maneuvering image 33 is intended to show a driving maneuver, during which the driver enters the traffic circle 27 via the intersecting road 30 and exits the traffic circle 27 again via the intersecting road 32. The schematic maneuvering image 33 shown in FIG. 7 is based solely on route-related data such that only roads and traffic circles are displayed that respectively converge with the route or form part of the route. Consequently, a circle symbol 34 for symbolizing the traffic circle 27, a road section 35 for symbolizing the intersecting road 30, a road section 36 for symbolizing the intersecting road 32 and a road section 37 for symbolizing the intersecting road 31 are shown in the schematic maneuvering image 33. However, radiating sections for symbolizing the intersecting roads 28 and 29 are not illustrated in the schematic maneuvering image 33 because these intersecting roads do not form part of the route and also do not converge with the route at any point.

When observing the schematic maneuvering image 33, the user has no intuitively correct perception of the configuration of the traffic circle 27. A significant discrepancy occurs, in particular, when the schematic maneuvering image 33 is compared with road signs that show the traffic circle 27 with the intersecting roads 28 to 32, namely because the intersecting roads 28 and 29 are shown on the road signs. If the driver departs from the route in the traffic circle and passes the intersecting road 32, he is no longer able to sufficiently orient himself based on the schematic maneuvering image 33 because the intersecting roads 28 and 29 reached after passing the intersecting road 32 are not shown in the schematic maneuvering image 33.

Figure 8:
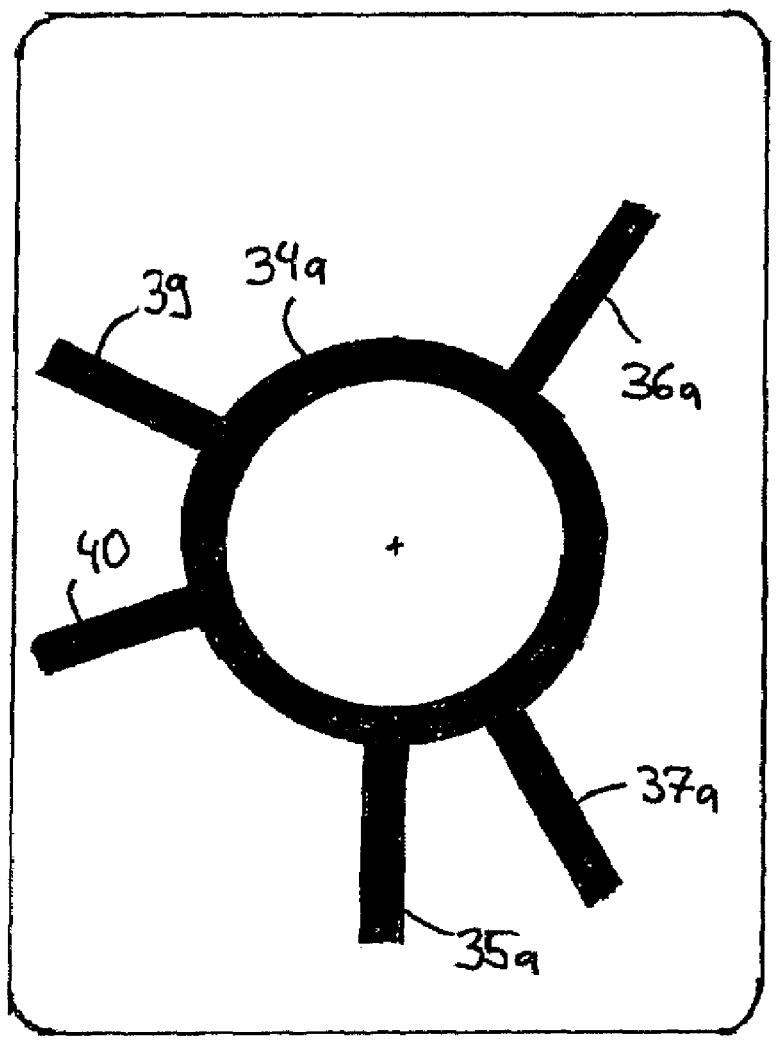
FIG. 8 is an inventive illustration of a schematic maneuvering image of the traffic circle according to FIG. 6.
Figure 8:

FIG. 8 shows a schematic maneuvering image 38 that was computed in accordance with a variation of the inventive method. The traffic circle 27 was completely analyzed with respect to its configuration, particularly with respect to all intersecting roads that converge with the traffic circle, such that all intersecting roads 28 to 32 are illustrated in the form of the radiating sections 35a, 36a, 37a, as well as the additionally shown road sections 39 and 40 that serve for symbolizing the intersecting roads 28 and 29. When observing the schematic maneuvering image 38, the user has a direct and intuitively correct perception of the configuration of the traffic circle 27.

Figure 9:
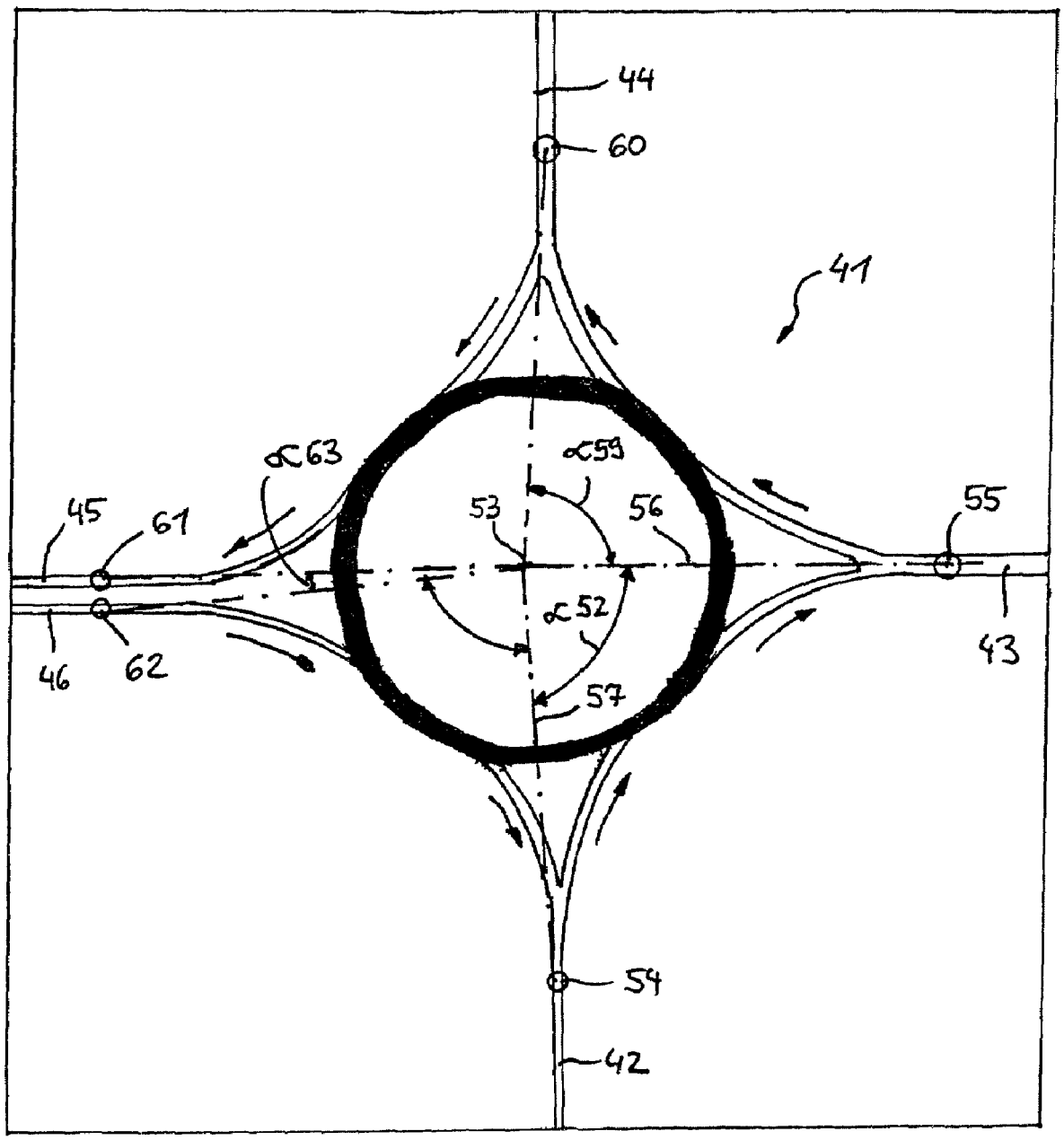
FIG. 9 is a section of a geographic area with a third embodiment of a traffic circle.

FIG. 9 shows a map section with a traffic circle 41 that converges with the intersecting roads 42 to 46. The roads 42 to 44 consist of two-way roads that intersect the traffic circle 41 with a separate entrance and exit. However, the intersecting roads 45 and 46 respectively consist of one-way roads that were formed by structurally separating a common roadway. The two one-way roads 45 and 46 are stored in the database with the "multidigitized" attribute.

Figure 10:
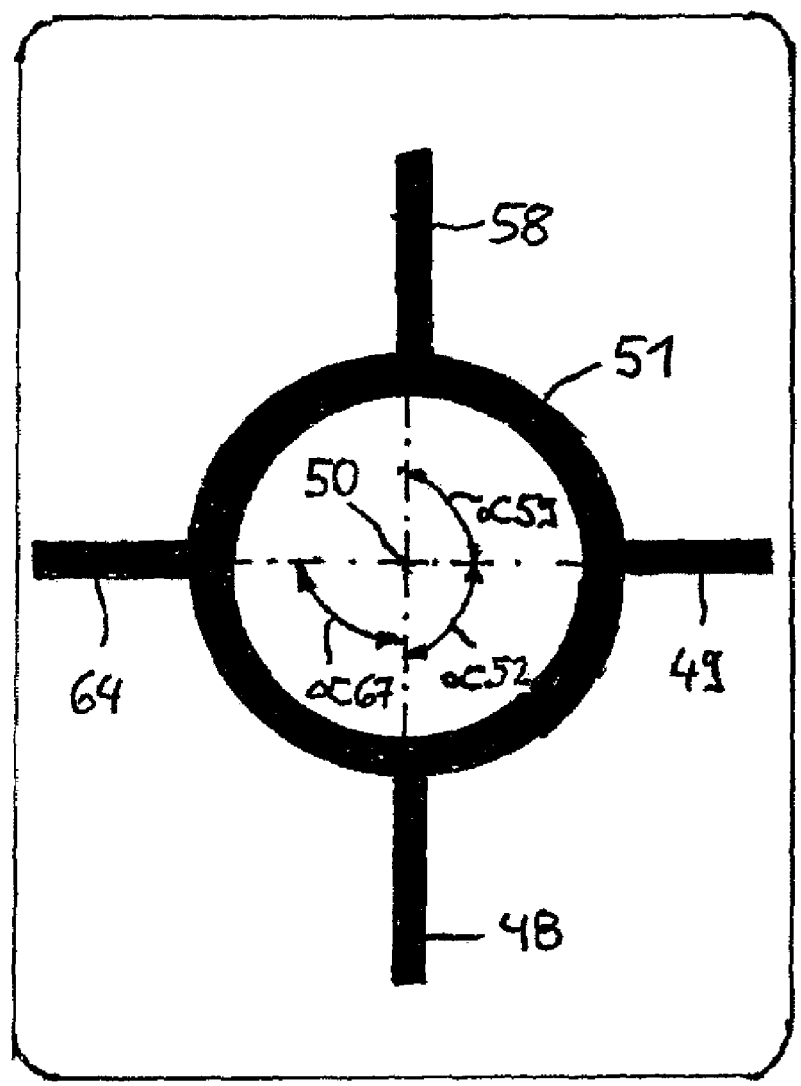
FIG. 10 is an inventive illustration of a schematic maneuvering image of the traffic circle according to FIG. 9.

FIG. 10 shows a schematic maneuvering image 47 for illustrating a driving maneuver, in which the traffic circle 41 is entered via the intersecting road 42. Consequently, the intersecting road 42 is illustrated as entering intersecting road in the schematic maneuvering image 47, namely in the form of a radiating section 48 that points vertically downward. The intersecting road 43 is also illustrated in the form of a simple radiating section 49 in the schematic maneuvering image. Analogous to all radiating sections in the schematic maneuvering images according to the invention, the extension of the radiating section 49 extends through the center 50 of the circle symbol 51 that symbolizes the traffic circle 41. In order to obtain the intermediate angle α52 that represents the only degree of freedom of the radiating section 49 relative to the radiating section 48 for the intuitively correct illustration, the geometric data of the traffic circle 41 and of the intersecting roads 42 and 43 are evaluated in a simple fashion.

During this evaluation, the actual center 53 of the traffic circle 41 is initially determined by adding and subsequently dividing the local coordinates describing the traffic circle. Subsequently, interpolation points 54 and 55 are respectively placed on the intersecting roads 42 and 43. The interpolation points 54 and 55 characteristically do not form part of the traffic circle. The interpolation points 54 and 55 may be defined, for example, in such a way that they are positioned a certain distance from the roadway of the traffic circle 41. Subsequently, the intermediate angle α52 is computed from the coordinates of the center 53 and of the respective interpolation points 54 and 55, as well as the thusly defined straight lines 56 and 57. This already concludes the geometric analysis in the geometric data of the traffic circle 41 and of the intersecting roads 42 and 43 such that the radiating section 49 can be illustrated relative to the position of the radiating section 48 in the schematic maneuvering image 47. In this case, the intermediate angle α52 reflects the local correlation between the intersecting roads 42 and 43 in an intuitively correct fashion, wherein it should be noted, in particular, that the significant curvature radii of the entrances and exits to/from the traffic circle 41 are blanked out due to the inventive computing method.

This method is repeated with respect to the intersecting road 44 and the radiating section 58 symbolizing the intersecting road 44 in the schematic maneuvering image 47 is illustrated relative to the radiating section 49 in the schematic maneuvering image 47 with an intermediate angle α59 that results from the geometric analysis of the center 53, the interpolation point 55 and the interpolation point 60 that lies on the intersecting road 44.

Figure 11:
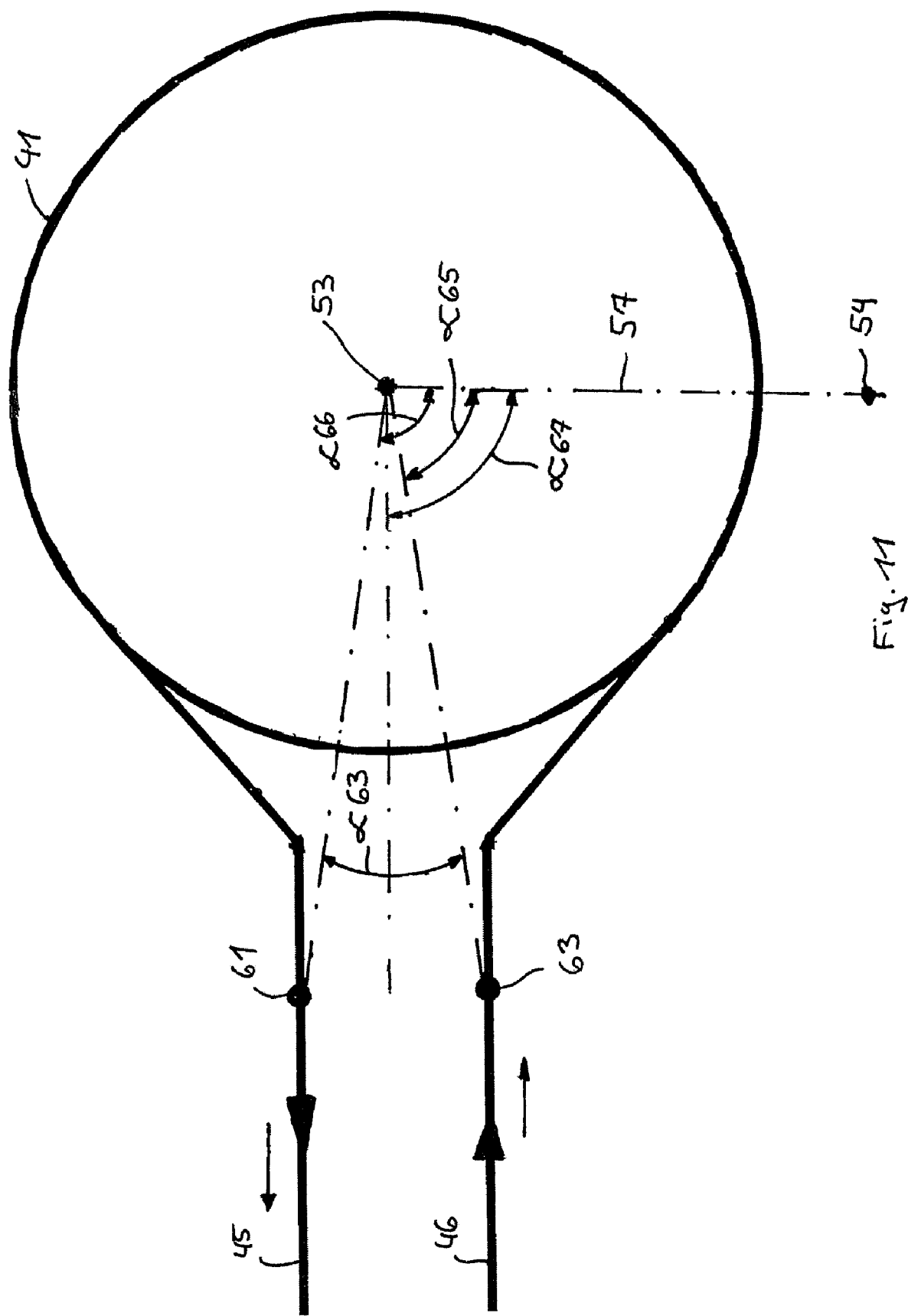
FIG. 11 is a schematic illustration of the analysis of the traffic circle according to FIG. 9 with respect to the illustration of two one-way roads that are identified as being multi-digitized.

The corresponding intermediate angles are also determined for the two intersecting roads 45 and 46 that consist of one-way roads with the multidigitized attribute by evaluating the interpolation points 61 and 62 relative to the center 53. The evaluation with respect to the intersecting roads 45 and 46 is illustrated in an enlarged fashion in FIG. 11, wherein the road elements that are not required for the evaluation of the intersecting roads 45 and 46 are not shown in this figure. Due to the analysis of the traffic circle 41, both intersecting roads 45 and 46 are registered as one-way roads with multidigitized attribute. In addition, the intermediate angle α63 is known due to the geometric evaluation of the interpolation points 61 and 62 relative to the center 53. The intermediate angle α63 between the two one-way roads 45 and 46 is compared with a predefined limiting angle. In the example shown, the intermediate angle α63 between the two one-way roads 45 and 46 lies below the limiting angle such that both one-way roads 45 and 46 are classified as extending closely adjacent to one another. Two one-way roads with the multidigitized attribute that extend in opposite directions and were classified as extending closely adjacent to one another are graphically symbolized together by a radiating section 64 analogous to a two-way road. In other words, this means that these two roads are symbolically illustrated in the form of a common two-way road in the schematic maneuvering image although the intersecting roads 61 and 62 consist of one-way roads that are digitized separately and carry the multidigitized attribute. This illustration corresponds to the intuitive perception of the user who typically interprets one-way roads extending closely adjacent to one another as one road.

In order to illustrate the radiating section 64, it is necessary to determine the intermediate angle α65, at which the radiating section 64 should be displayed relative to the radiating section 48. In this case, the intermediate angle α67 corresponds to the average value of the intermediate angles α65 and α66 that result from the geometric evaluation of the interpolation point 54 that lies on the intersecting road 42, the center 53 and the two respective interpolation points 61 and 62 that lie on the intersecting roads 45 and 46.

Figure 12:
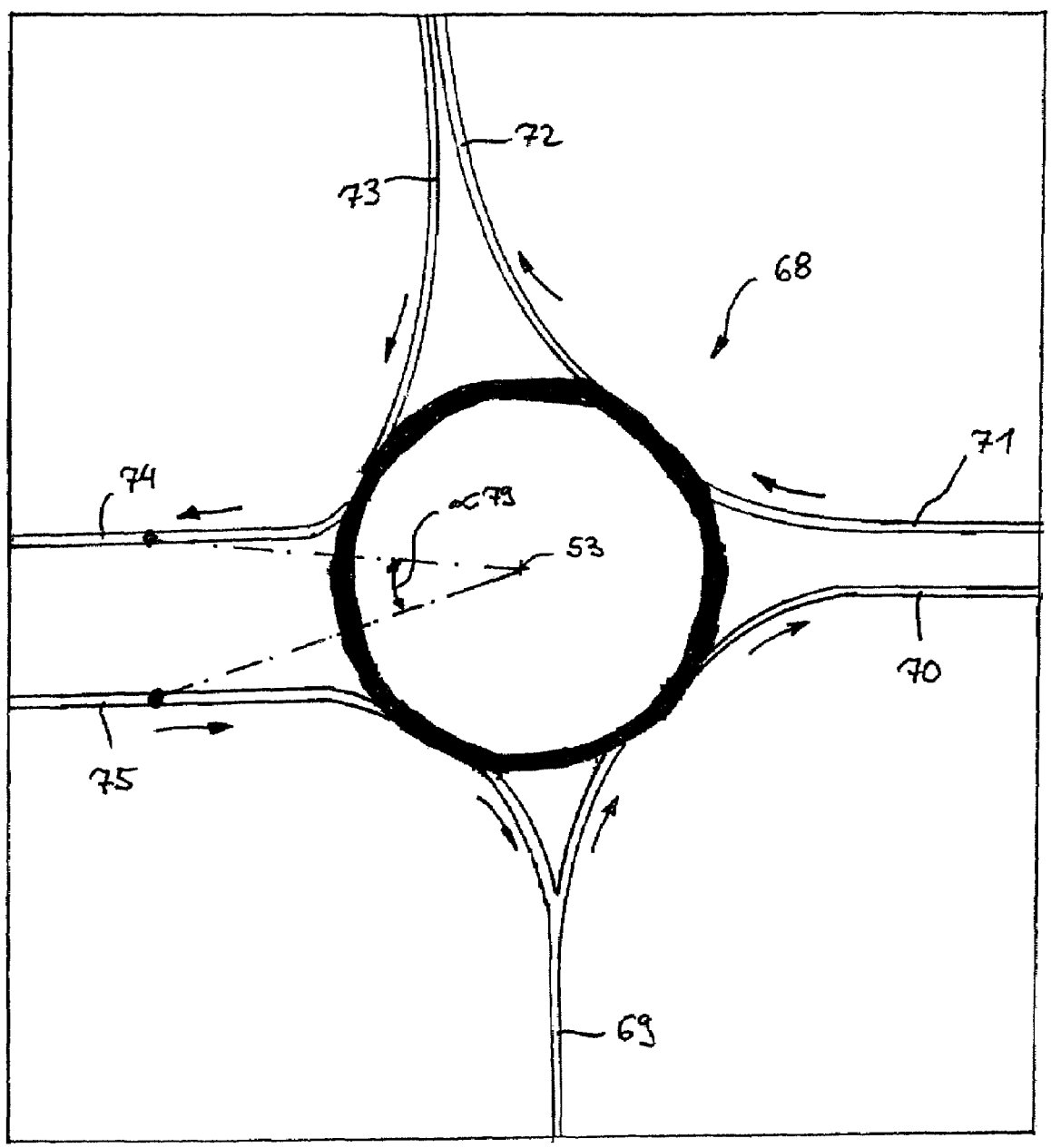
FIG. 12 is a section of a geographic area with another embodiment of a traffic circle.

FIG. 12 shows a map section with a traffic circle 68 and the intersecting roads 69 to 75.

Figure 13:
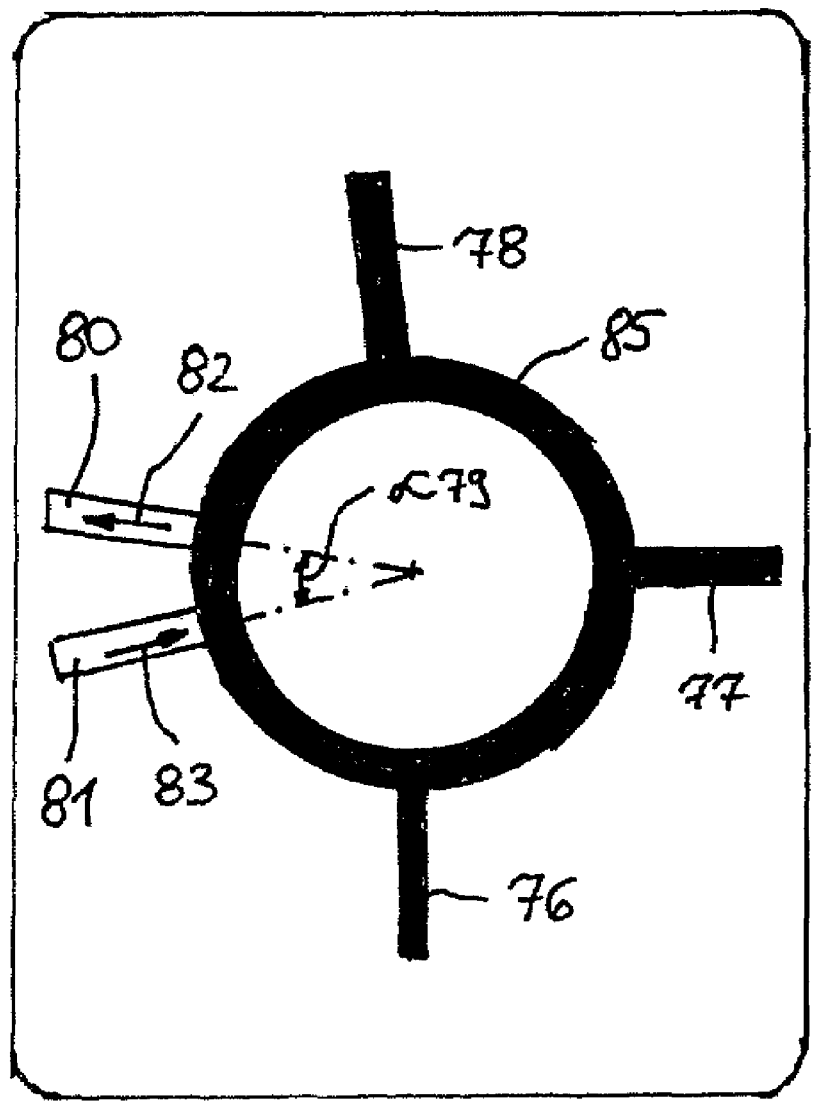
FIG. 13 is an inventive illustration of a maneuvering image of the traffic circle according to FIG. 12.

FIG. 13 shows a schematic maneuvering image 84 for graphically symbolizing maneuvers in the traffic circle 68. The traffic circle 68 is symbolized by the circle symbol 85. The intersecting road 69 that is marked as a two-way road is illustrated in the form of a radiating section 76. The two one-way roads 70 and 71 carrying the multidigitized attribute are identified as extending closely adjacent to one another and are illustrated in the form of the radiating section 77 in the schematic maneuvering image 84 analogous to a two-way road. This also applies to the two one-way roads 72 and 73 that also carry the multidigitized attribute and are symbolized by a radiating section 78 analogous to a two-way road.

The two intersecting roads 74 and 75 are marked as one-way roads. An evaluation of the intermediate angle α79 also shows that this intermediate angle lies above the predefined limiting angle such that the two one-way roads 74 and 75 are not classified as extending closely adjacent to one another. Based on this analysis, the two one-way roads 74 and 75 are illustrated in the form of separate radiating sections 80 and 81 in the schematic maneuvering image 84. In this case, the illustration of the road sections 80 and 81 differs from the radiating sections 76 to 78 that symbolize two-way roads. The radiating sections 80 and 81 have a different color coding, namely a brighter color coding, and furthermore indicate the permitted driving direction of the one-way roads 74 and 75 in the form of driving directions symbols 82 and 83.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

The invention claimed is:

1. A method for operating a navigation system with the following steps:
   a) computing, using a processor associated with the navigation system, a route from a starting point to a destination, wherein the route consists of a sequence of road segments and junctions between the road segments that is selected from a database of a geographic area including road segments and junctions, with a route computation method,
   b) computing, on the processor, at least one maneuvering instruction that contains instructions for the user in order to follow the route from the current position, and
   c) computing and displaying, on the processor, a schematic maneuvering image on a display device, wherein the schematic maneuvering image graphically illustrates the maneuvering instruction in schematic form;
   wherein adjacent junctions that do not lie along the route and adjacent road segments that do not lie along the route and do not converge with a junction along the route are also analyzed during the computation of the schematic maneuvering image, wherein at least part of the adjacent road segments and adjacent junctions is illustrated in the schematic maneuvering image in addition to the maneuvering instruction that represents the route,
   wherein junctions of the traffic circle and road segments of the traffic circle that do not lie along the route and road segments that do not form part of the traffic circle and converge with at least one junction of the traffic circle, including entrances and exits of the traffic circle that do not lie along the route, are also analyzed during the computation of the schematic maneuvering image for graphically illustrating a maneuver in a traffic circle in schematic form, wherein at least part of these junctions and road segments is also illustrated in the schematic maneuvering image,
   wherein it is determined during the analysis of the junctions and road segments if a respective road segment consists:
      a) of a two-way road with an entrance and an exit, or,
      b) of a one-way road with an entrance or an exit;
   wherein it is also determined during the analysis of the intersecting roads if the traffic circle features a plurality of one-way roads, wherein two one-way roads that extend in opposite directions closely adjacent to one another are jointly illustrated in the schematic maneuvering image in a paired fashion as a common radiating section analogous to a two-way road;
   wherein an intermediate angle between a first radiating section that symbolizes an intersecting road and a second radiating section that jointly symbolizes two one-way roads analogous to a two-way road, corresponds to an average value of a first intermediate angle and a second intermediate angle, wherein the first intermediate angle is derived from the angle between the intersecting road and the first one-way road, and wherein the second intermediate angle is derived from the angle between the intersecting road and the second one-way road.

2. The method according to claim 1, wherein the road segments and junctions are illustrated in the schematic maneuvering image as radiating sections.

3. The method according to claim 1, wherein the schematic maneuvering image illustrates the second radiating section based on the intermediate angle.

4. The method according to claim 1, in which the position of the center of the traffic circle is derived from the data of the road segments and junctions that form part of the traffic circle and is taken into account in the computation and display of the schematic maneuvering image.

5. The method according to claim 1, wherein the X-coordinate of the center of the traffic circle is computed by adding all X-coordinates of the junctions and the road segments that form part of the traffic circle and dividing the sum by the number of junctions and road segments, and in that the Y-coordinate of the center of the traffic circle is computed by adding all Y-coordinates of the junctions and the road segments that form part of the traffic circle and dividing the sum by the number of junctions and road segments.

6. The method according to claim 1, wherein the two one-way roads are identified as closely adjacent to one another if the intermediate angle between the two one-way roads is smaller than a predefined limiting angle.

* * * * *